UNITED STATES PATENT OFFICE.

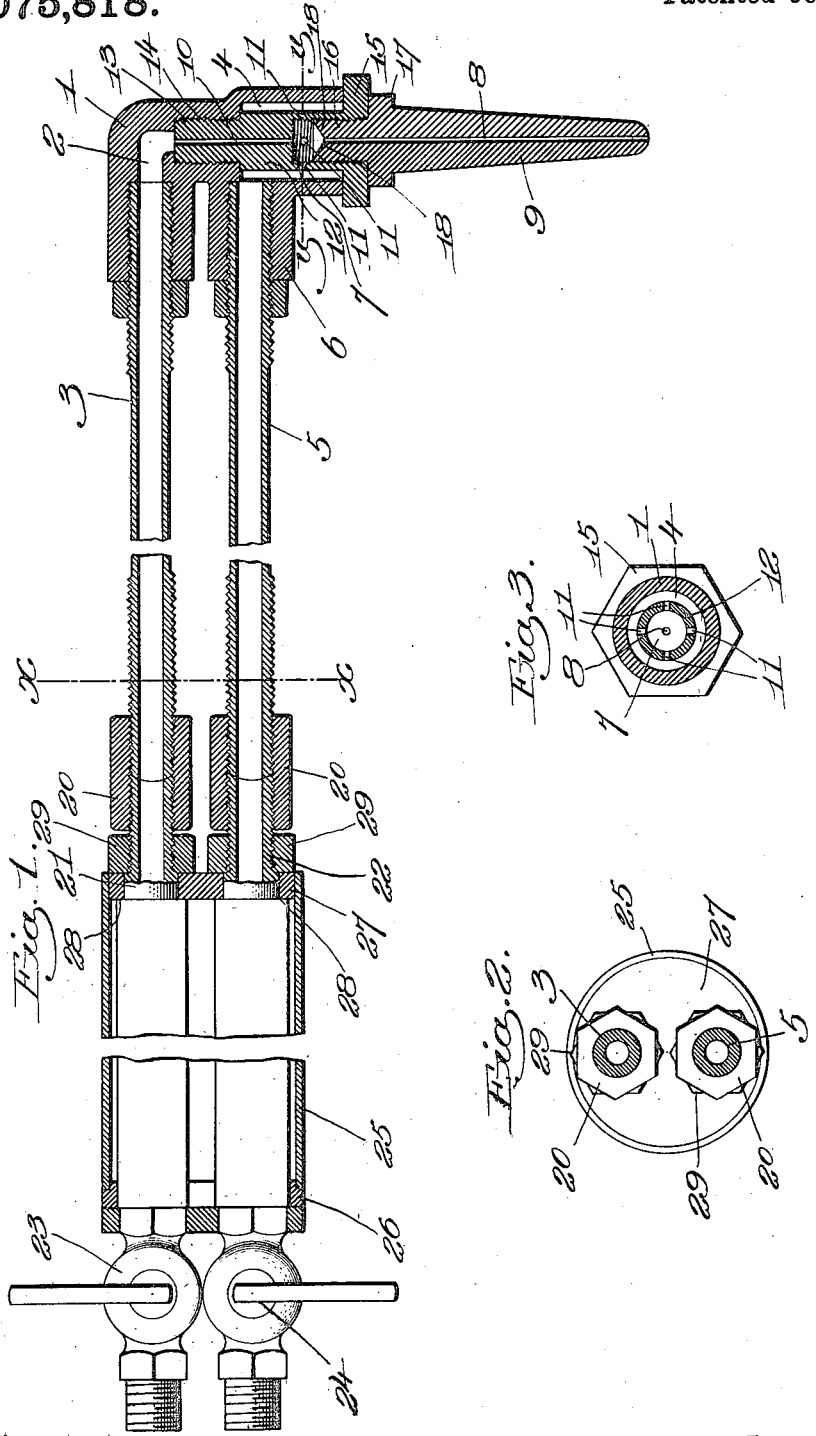

MELBOURNE K. DUNHAM, OF BOSTON, MASSACHUSETTS.

BLOWPIPE AND METHOD OF USING GASES THEREIN.

1,075,818.   Specification of Letters Patent.   Patented Oct. 14, 1913.

Application filed January 12, 1912. Serial No. 670,785.

*To all whom it may concern:*

Be it known that I, MELBOURNE K. DUNHAM, a citizen of the United States, residing at Boston, county of Suffolk, State of Massachusetts, have invented an Improvement in Blowpipes and Method of Using Gases Therein, of which the following description, in connection with the accompanying drawing, is a specification, like characters on the drawing representing like parts.

This invention relates to blow pipes of that type which are commonly used for welding, brazing or cutting metal, and which are arranged to burn a mixture of some combustible gas, such as acetylene and a gaseous supporter of combustion, such as oxygen. In all devices of this nature with which I am familiar, the oxygen is delivered into a central passage leading into a mixing chamber while the acetylene or other combustible gas is delivered into an annular chamber which surrounds this central passage, but which communicates therewith through suitable ports. The manner of discharging the oxygen into the mixing chamber and the arrangement of said ports for delivering the acetylene gas thereto are usually such that the stream of oxygen which is delivered to the mixing chamber under a considerable pressure operates to create sufficient suction at the delivery end of said ports to draw the acetylene (which is usually operated under a less pressure) into the mixing chamber on the injector principle. The head of a blow pipe of this nature is apt to become quite hot after continued use, and as a result the acetylene in the chamber which surrounds the oxygen duct or passage soon becomes considerably heated; in fact it often gets heated to such an extent that it becomes ignited, thus causing what is commonly called a "flash back." If the construction of the blow pipe is such that the acetylene-containing chamber is of considerable size a flash back is very likely to cause a dangerous explosion.

In order to get the best results from blow pipes it is necessary that the gases should be thoroughly mixed before they are ignited, and in order to accomplish this it is essential that they be delivered to the mixing chamber at somewhere near the same temperature, for if one of the gases is at a much higher temperature than the other, they do not readily mix. In the type of blow pipe above referred to the oxygen which is usually operated under considerable pressure is delivered centrally into the mixing chamber, and as it passes into the mixing chamber it expands more or less, thus producing a cooling effect which tends to lower its temperature. On the other hand, the acetylene gas which is delivered into the chamber surrounding the oxygen duct becomes abnormally heated so that it is delivered to the mixing chamber at a very much higher temperature than the oxygen. This results in an imperfect mixture and a consequent loss of efficiency in the flame.

The principal object of my invention is to provide a novel blow pipe and a novel method of using the gases therein which will overcome the above-noted objections.

More specifically, the invention aims to provide a novel arrangement by which the gases are delivered to the mixing chamber at substantially the same temperature so that a thorough mixture will result, and to provide a construction by which the oxygen is delivered into a chamber that surrounds the duct leading to the mixing chamber and through which the acetylene gas is delivered, so that the cooling effect due to the expansion of the oxygen in its expansion chamber will keep the acetylene gas from becoming heated and will thereby prevent the occurrence of a flash back.

Other objects of the invention are to improve generally blow pipes of this nature, all as will be more fully hereinafter described and then pointed out in the appended claims.

Referring to the drawings wherein I have illustrated the preferred embodiment of my invention, Figure 1 is a sectional view through a blow pipe made in accordance with my invention; Fig. 2 is a section on the line $x$—$x$, Fig. 1; Fig. 3 is a section on the line $y$—$y$, Fig. 1.

1 represents the body of the blow pipe which is provided with a duct 2 which communicates with a pipe 3 that is connected to the blow pipe and through which the acetylene gas is delivered. This body 1 is formed with a chamber 4 that constitutes an expansion chamber for the oxygen, and said chamber has communication with a pipe 5 that is screw-threaded into a boss formed on the head and which is connected to the source of oxygen supply.

7 designates a mixing chamber in which the oxygen and acetylene are mixed, and this chamber communicates with a burner passage 8 formed in a tip 9. The acetylene is delivered centrally into the mixing chamber 7 through a duct 10 that communicates with the duct 2, and the oxygen is delivered from the expansion chamber 4 into said mixing chamber through inclined ports 11. The expansion chamber 4 surrounds the duct 10 and also surrounds the mixing chamber, and in the operation of the device the oxygen which is delivered under considerable pressure will expand in the chamber 4, as will be hereinafter pointed out, and thus produce a cooling effect which will help to maintain the walls of the body cool and will prevent the heat of the flame from unduly heating the acetylene gas. As a result, the two gases are delivered to the mixing chamber at substantially the same temperature, and a perfect mixture is readily obtained. This arrangement of ports and chambers is secured by the following construction: The duct 10, the ports 11 and mixing chamber 7 are formed in an intermediate member 12 which is provided with the exteriorly screw-threaded extension 13 that screws into an interiorly-screw-threaded recess 14 formed in the body. Said intermediate member 12 is also provided at its outer end with a flange 15 which engages the end of the body 1 and closes the open end of the chamber 4. The intermediate member is provided with the duct 10 situated to communicate with the duct 2 when said member is in place and is also chambered out to form the mixing chamber 7 into which the inclined ports 11 lead.

The removable tip 9 is provided with the screw-threaded extension 16 which screws into the intermediate member 12, said tip being preferably provided with the non-circular portion 17 to which a wrench may be applied. The intermediate member 12 is of less diameter than the interior diameter of the chambered portion of the head 1 so that an annular chamber 4 is formed when the intermediate member is in place. The screw-threaded extension 16 is preferably provided at its inner end with a recess having tapered walls 18, and these walls have substantially the same inclination as the ports 11. The flange 15 is also preferably made non-circular so that a wrench can be applied thereto for removing the intermediate member.

The acetylene and oxygen may be delivered to the pipes 3 and 5 in any suitable way. As herein shown, said pipes are connected by the couplings 20 with two pipes 21, 22 which will preferably contain some suitable filter material through which the gas is filtered. These pipes 21, 22 are each provided with controlling valves 23, 24, respectively, by which the supply of gas to the pipes 3 and 5 is regulated, said valves being connected by any suitable means with the sources of gas supply.

In order to make a convenient handle for manipulating the blow pipe, I have provided a sleeve 25 which encircles the two pipes 21, 22 and which is of sufficient length so that it can be gripped by the person manipulating the device. One end of the sleeve is secured to the head 26 which has apertures through which the pipes 21, 22 extend. The other end of the sleeve is soldered or otherwise fastened to another ring or head 27 through which said pipes extend. These pipes 21, 22 are preferably provided with the shoulders 28 against which the ring 27 rests, and said ring is held in place by the nuts 29 that are screw-threaded onto the pipes.

In the operation of the device the oxygen gas is supplied from a tank which contains the gas under a high pressure, and when the gas is delivered through the valve 24 it expands to a considerable extent in the pipe 5 and in the chamber 4 so that the pressure of the oxygen in the chamber 4 is very much less than that in the supply tank. Whenever a gas expands from a high to a low pressure there will be a corresponding reduction of temperature due to the expanding action of the gas. My invention aims to make use of the reduction of temperature thus produced by the expansion of the oxygen for maintaining the head of the implement comparatively cool. The temperature of the oxygen gas which is delivered to the pipe 5 and chamber 4 is reduced due to the expanding action of the gas, and this reduced temperature produces a cooling effect in the chamber 4 which counteracts to a considerable extent the tendency of the body 1 to become heated from the heat of the flame. The acetylene gas is delivered through the ducts 2 and 10 directly into the mixing chamber 7, and in its passage into said chamber and while in the chamber it is prevented from becoming unduly heated by the presence of the oxygen in the chamber 4. The oxygen and acetylene are delivered to the mixing chamber 7 at somewhere near the same temperature, and as a result they readily become thoroughly mixed so that a good mixture is delivered through the passage 8 of the tip. Moreover, the fact that the acetylene is delivered centrally into the mixing chamber 7 and is protected by the surrounding wall of the oxygen gas in the chamber 4 prevents said acetylene gas from getting unduly heated. Thus all danger of a flash back is avoided. Moreover with my improved device an explosion cannot occur in any of the passages of the body because there is not at any time any quantity of acetylene or other combustible gas in any of the passages, all of said passages being comparatively small.

One of the important features of my invention is that there is no chamber in the device which contains a supply of combustible gas and which is subjected to the heating effect of the flame produced. The only body of combustible gas is that contained in the pipe 3 and ducts 2 and 10 and as these are comparatively small there is not a sufficient body of combustible gas at any point to cause an explosion. Moreover, the acetylene pipe 3 is situated farther from the flame than the oxygen pipe 5, and so the pipe 3 is protected from the heat of the flame by said pipe 5.

While I have described the preferred embodiment of my invention, I do not wish to be limited to the constructional details shown, as they may be changed in various ways without departing from the spirit of the invention.

Having fully described my invention, what I claim as new and desire to secure by Letters Patent is:—

1. The method of using oxygen and a combustible gas, such as acetylene, in a blow pipe which has a mixing chamber and a burner passage leading therefrom, which consists in delivering the acetylene gas directly into the mixing chamber from the rear and allowing oxygen held under a high pressure to expand into a chamber which is separate from but surrounds the mixing chamber and the acetylene gas passage leading thereto whereby the reduction of temperature caused by the expanding action of the oxygen gas counteracts, the heating effect produced by the flame on the acetylene gas being delivered to the mixing chamber so that the gases are delivered to the mixing chamber at somewhere near the same temperature.

2. In a blow pipe, the combination with a chambered body open at one end and having an acetylene gas duct leading into one end of the chamber which duct terminates in an interiorly screw-threaded recess in said chambered body, of an intermediate member situated in said chamber and provided at one end with an extension which is screw-threaded into said recess and at the other end with a flange which engages the end of the body and closes the open end of said chamber, that portion of said intermediate member which is situated within said chamber being smaller than said chamber whereby an annular expansion chamber of considerable volume is provided exterior to said intermediate member, means for expanding oxygen into said annular chamber said intermediate member having within it a mixing chamber and a duct leading centrally into and communicating with the acetylene gas duct, and inclined ports leading into said mixing chamber and communicating with the annular expansion chamber, and a tip removably secured to said member.

In testimony whereof, I have signed my name to this specification, in the presence of two subscribing witnesses.

MELBOURNE K. DUNHAM.

Witnesses:
LOUIS C. SMITH,
THOMAS J. DRUMMOND.